United States Patent Office 2,959,600
Patented Nov. 8, 1960

2,959,600
PURIFICATION OF MALEIC ANHYDRIDE

Gerardus M. M. Houben, Gouda, Netherlands, assignor to Stamicarbon N.V., Heerlen, Netherlands No Drawing. Filed July 14, 1958, Ser. No. 748,123

Claims priority, application Netherlands July 24, 1957

4 Claims. (Cl. 260—346.8)

The present invention relates to the purification of maleic anhydride.

A difficulty experienced when maleic anhydride is purified by distillation is that in the first stage of this distillation a colored product is obtained. Thus, it is not until a substantial amount of the maleic anhydride to be treated, usually about 50% thereof, has been distilled, that a colorless, pure product is obtained. Even with repeated distillation of the colored product it is impossible to remove the colored impurities without considerable losses.

The abovementioned disadvantages are effectively obviated, according to the present invention, by means of a process which involves adding paraldehyde to the impure maleic anhydride, boiling the resulting mixture and then distilling the thus treated anhydride. Desirably, the boiling of the maleic anhydride to which paraldehyde has been added, is usually carried out at a temperature of 100–125° C., and a pressure of 30–50 mm. Hg. However, lower or higher perssures, with correspondingly lower or higher temperatures, may also be used. In order to avoid losses during the boiling operation, this step is preferably carried out under reflux. The time of boiling can be varied but, generally speaking, the boiling need proceed for only a short time, e.g. an hour or a little less.

The amount of paraldehyde can be varied but it is not necessary to utilize large amounts thereof. A small amount, e.g. less than 3% by weight and down to about 0.1% by weight, based on the impure maleic anhydride, is usually sufficient to ensure good results.

After the boiling operation, the distillation step may be carried out at a reduced pressure corresponding to that at which boiling took place or, if desired, different pressure and temperature conditions may be used. It has been found that, as a result of the preliminary boiling operation, pure maleic anhydride is obtained after less than 10% by volume has been distilled. This is significantly better than the conventional distillation procedures wherein, as indicated heretofore, pure maleic anhydride is not obtained until about 50% by volume of the impure material undergoing treatment, has been distilled.

The invention will be more fully understood by the following example which is given for purposes of illustration:

1610 grams of a yellow maleic anhydride was heated, after addition of 32 grams of paraldehyde, to 104–105° C., at a pressure of 32 mm. Hg, under which conditions the mixture boiled. Boiling was continued for 60 minutes under reflux.

Subsequently, the thus treated anhydride was distilled, the distillation being carried out at a temperature of 104–116° C., and a pressure of 32–49 mm. Hg. After 29 g. of paraldehyde had been separated and 55 g. of colored product had been collected in the first runnings, 1530 g. of purified maleic anhydride came over while 25 g. of residue remained in the still.

By way of comparison another quantity of 1610 grams of the same colored maleic anhydride was heated in the identical manner to 104–105° C. (pressure 32 mm. Hg), without the addition of paraldehyde. Boiling was continued under reflux for one hour. Subsequently, the mixture was distilled at 104–116° C., and a pressure of 32–49 mm. Hg. A pure product was obtained only after 830 g. of colored product had distilled off.

The process of the invention appears to be generally applicable to the purification of crude maleic anhydride obtained in any conventional manner. Thus, for example, the crude maleic anhydride treated herein may be obtained by the oxidation of benzene by passing same with air over a vanadium oxide catalyst. Maleic anhydride obtained in this way contains benzoquinones, among other impurities. However, the invention is not limited to the treatment of crude maleic anhydride obtained in this manner.

It will be appreciated that various modifications can be made in the invention described herein without deviating from the scope thereof as set forth in the accompanying claims wherein:

I claim:

1. A process for purifying maleic anhydride produced by the oxidation of benzene which comprises adding paraldehyde to said maleic anhydride, boiling the resulting mixture and then distilling said anhydride.

2. The process of claim 1 wherein the amount of paraldehyde added is less than 3% by weight based on the anhydride.

3. The process of claim 1 wherein said boiling is carried out under reflux.

4. The process of claim 3 wherein said boiling is carried out at a temperature between 100° and 125° C., and a pressure between 30 and 50 mm. Hg.

References Cited in the file of this patent

UNITED STATES PATENTS 2,518,312    Hartig ------------------ Aug. 8, 1950